Nov. 7, 1972    C. C. CHAFFIN    3,702,139
APPARATUS FOR HANDLING CARPET ROLLS
Filed Oct. 5, 1971    4 Sheets-Sheet 1
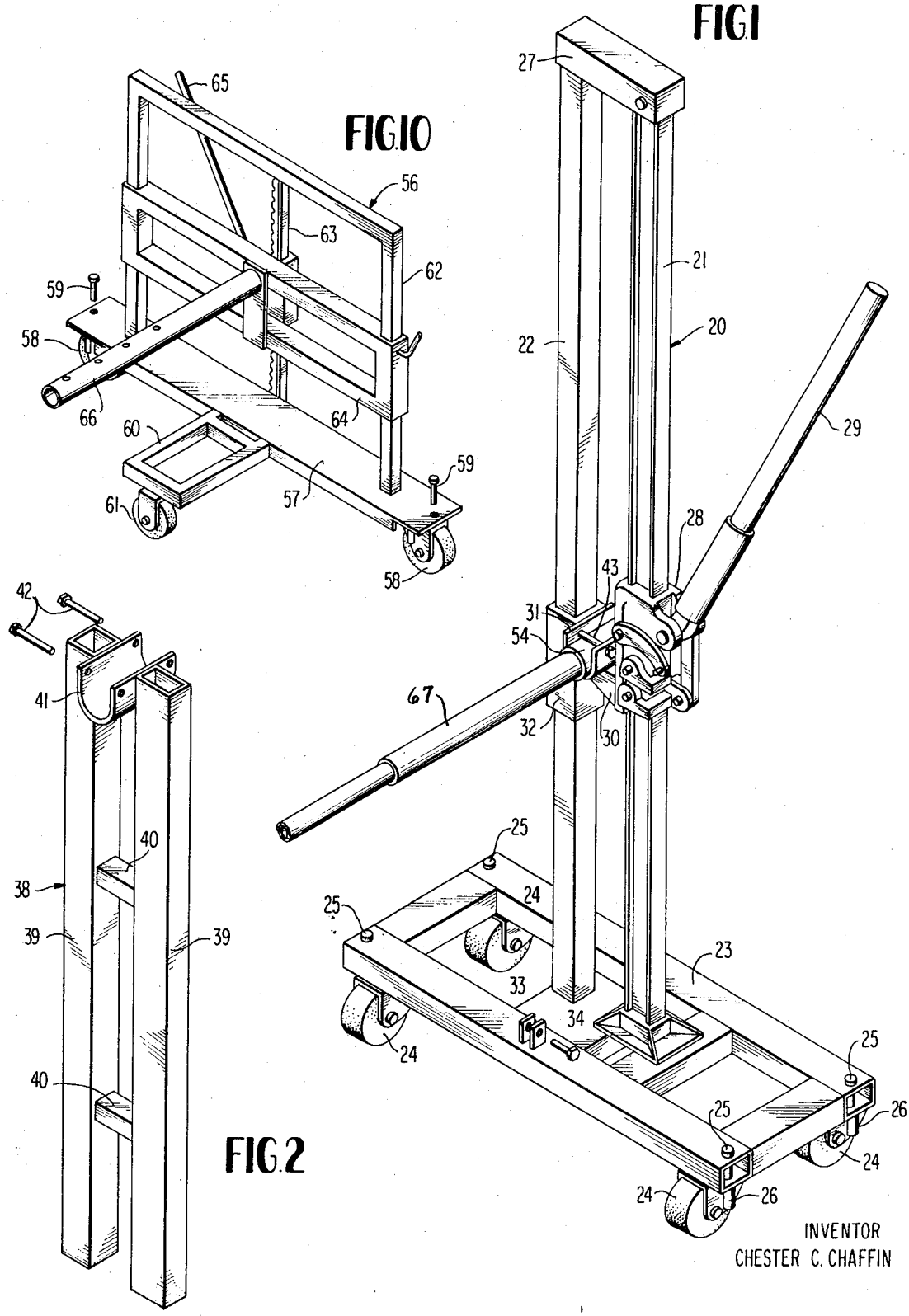
INVENTOR
CHESTER C. CHAFFIN

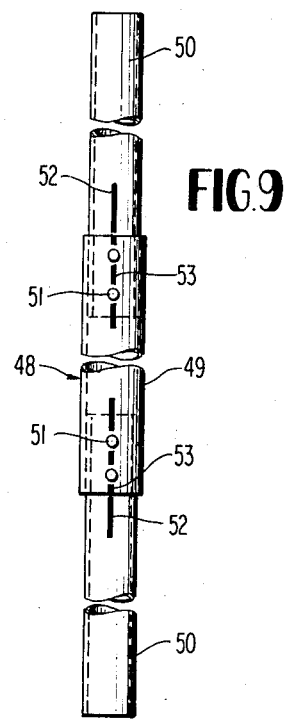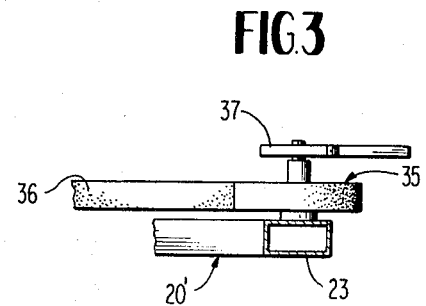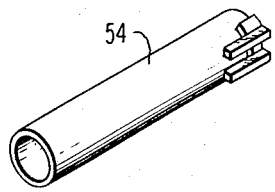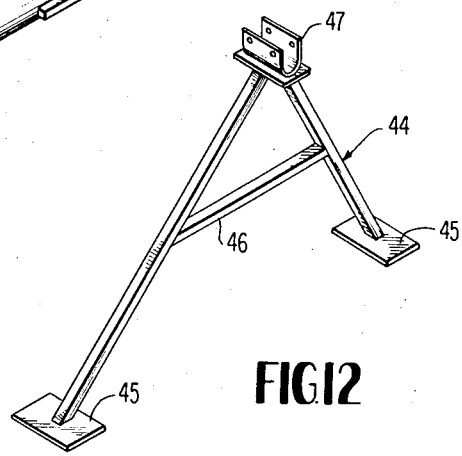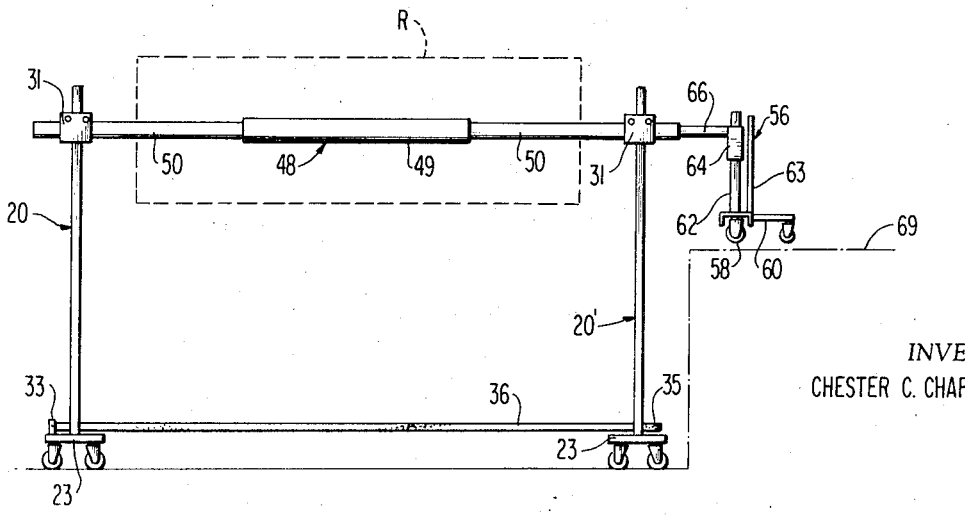

INVENTOR
CHESTER C. CHAFFIN

United States Patent Office 3,702,139
Patented Nov. 7, 1972

3,702,139
APPARATUS FOR HANDLING CARPET ROLLS
Chester C. Chaffin, 527 S. 4th W.,
Missoula, Mont. 59801
Filed Oct. 5, 1971, Ser. No. 186,712
Int. Cl. B60p 1/64
U.S. Cl. 214—38 C                                11 Claims

ABSTRACT OF THE DISCLOSURE

An apparatus for lifting, transporting and racking heavy rolls of carpet embodies a pair of cooperating mobile jack units with extra height extensions, a third foreshortened mobile jack, a pair of carpet roll stands and an extension pole which receives the core of the carpet roll directly. The apparatus components coact to facilitate the lifting and moving of carpet rolls in stores and warehouses, the loading and unloading of rolls from trucks and the placement of rolls on elevated wall racks in stores.

BACKGROUND OF THE INVENTION

The handling of carpet rolls which weigh as much as 1200 pounds and measure up to fifteen feet long is a tremendous problem in the carpet industry. Fork lift trucks are commonly employed in warehouses for carpet but such trucks are obviously impractical for retail stores and furthermore they are extremely large and costly. No satisfactory equipment is available for loading rolls of carpet on the trucks and for removing the same and existing equipment does not provide for elevating the heavy rolls to a sufficient height for placement on elevated wall racks, thereby allowing the economical use of available storage space which is otherwise wasted.

The prior patented art exemplified by U.S. Pat. 3,404,-794, issued Oct. 8, 1968, proposes a rolled carpet handling truck but this patented apparatus does not possess the capability of performing all of the above-enumerated operations and manipulations of large carpet rolls which are required for a completely efficient service. Accordingly, there is still a great need for an improved carpet roll handling apparatus which has the necessary versatility to perform all of the essential handling steps with economy and with the absolute minimum of labor and initial equipment cost. It is the object of this invention to completely satisfy the continuing need in the prior art for such an apparatus.

The apparatus of the invention embodies a group of components which cooperate in a unique manner to completely satisfy all requirements for lifting, transporting, loading, unloading and racking even the heaviest carpet rolls in both wholesale and retail carpet establishments. The apparatus is constructed to negotiate average size door openings and it can be operated efficiently by one or two workers. Other detailed features and advantages of the invention will be apparent during the course of the following detailed description.

BRIEF DESCRIPTION OF DRAWING FIGURES

FIG. 1 is a perspective view of one of a pair of mobile jacking units embodied in the carpet roll handling apparatus.

FIG. 2 is a perspective view of an extension frame employed on each jacking unit.

FIG. 3 is a fragmentary side elevational view of a safety belt assembly employed on one jacking unit and used to interconnect the bases of the two jacking units during lifting operations.

FIG. 4 is a perspective view of a tubular adapter.

FIG. 9 is a fragmentary plan view of an extension pipe used to directly support a carpet roll on the apparatus.

FIG. 10 is a perspective view of a short jacking dolly used in the loading and unloading of trucks.

FIG. 11 is a partly diagrammatic side elevation of the apparatus in use for loading and unloading a truck.

FIG. 12 is a perspective view of one of the stationary carpet roll supporting stands.

DETAILED DESCRIPTION

Figure 5:
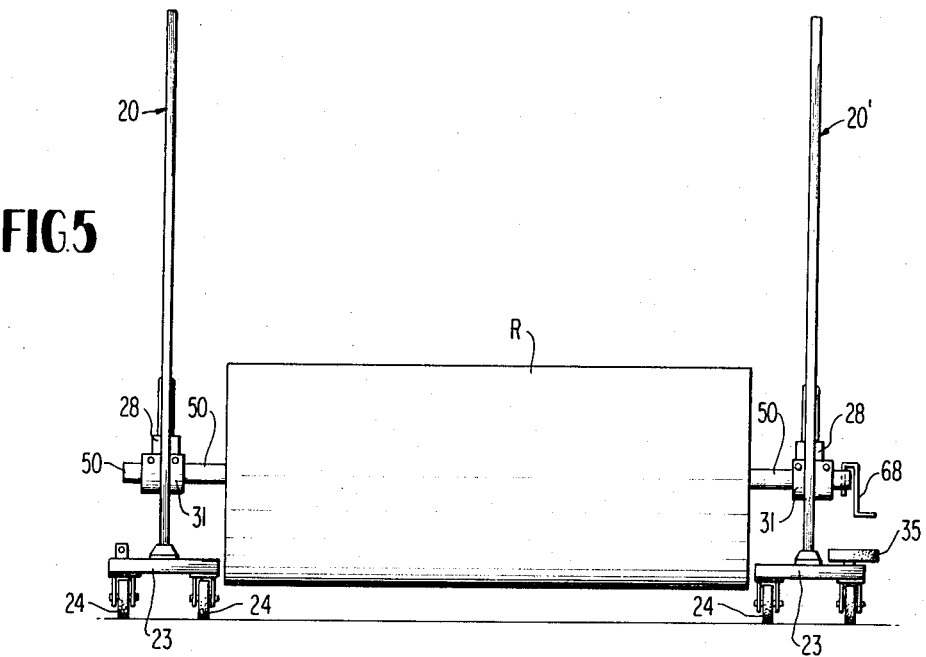
FIG. 5 is a side elevational view showing the use of the pair of jacking units as a wheeled dolly for a heavy carpet roll.

Referring to the drawing in detail wherein like numerals designate like parts, the apparatus embodies a pair of substantially identical mobile lifting or jacking units 20 and 20'. As shown primarily in FIG. 1, each jacking unit comprises a vertical jacking bar 21 and a laterally spaced parallel stabilizing bar 22, both suitably rigidly secured at their lower ends to a rectangular dolly 23 having corner caster wheels 24 which may be locked in parallel non-swiveling positions by pins 25 which enter sleeves 26 on the sides of the caster wheels. The dolly 23 is elongated and sufficiently narrow to pass through standard door openings. The tops of the bars 21 and 22 are rigidly interconnected by a removable cross brace 27.

Each jacking unit further comprises a conventional mechanical jacking head 28 which is capable of climbing the bar 21 and descending thereon step-by-step in response to the oscillation of a vertically swingable handle 29. The workings of such a jack are well-known in the art and need not be described in detail. Safety features to guard against falling are built into the jack.

The jack head 28 has a load lifting arm 30 projecting from one side thereof and this arm carries an upwardly open U-shaped saddle 31 to receive pipe means, to be described. Preferably, the unit 20 further comprises a short guide sleeve 32 suitably attached to the saddle 31 and movable along the stabilizer bar 22 upon which it is telescoped slidably. In this manner, the climbing jack mechanism is guided and supported on the two parallel bars 21 and 22 in a very stable and secure manner. The unit 20 further embodies on one side of the dolly 23 a connection 33 and a securing pin 34 for a flexible strap mounted on the coacting jacking unit 20'. This strap mechanism designated by the numeral 35 is shown in FIG. 3 and comprises a strong webbing or strap element 36 secured to a spool on the dolly 23 of unit 20'. A conventional ratchet-type strap tightening mechanism 37 is provided. As will be further explained, the strap or webbing is employed to connect the bases of the two lifting units 20 and 20' while under heavy loading FIG. 6, to keep them plumb and to prevent the dollies from spreading apart. The free end of the strap 36 attaches to the elements 33 and 34 of the opposing unit 20. It should also be mentioned that the caster wheels 24 of the units 20 and 20' may be equipped with conventional brakes.

An extension frame 38, FIG. 2, for each jacking unit 20 and 20' is provided to allow lifting of carpet rolls by the units to a substantial elevation such as eleven feet, so that the rolls may be placed on overhead wall racks or supports, not shown. Each extension frame 38 consists of a pair of spaced parallel tubular bars 39 which telescope over the bars 21 and 22 after removal of the cross brace 27. The lower ends of the bars 39 then rest upon the jack head 28 and the adjacent guide sleeve 32. The bars 39 are interconnected by rigid cross braces 40. The top of the extension frame 38 has a U-shaped saddle 41 fixedly secured between the tops of the bars 39, and this saddle has openings to receive safety pins 42 which assure that a pipe resting in the saddle will not become elevated therefrom. Similar pin means 43, FIG. 1, are preferably provided on the saddle 31, previously described.

The apparatus additionally comprises a pair of rigid A-frame stands or supports 44 which cooperate with the jacking units 20 and 20' in certain situations, one of the stands being shown in FIG. 12. Each upright A-frame stand has a pair of level feet 45 rigidly secured to its bottom and spread apart sufficiently to straddle the dolly 23 in the lengthwise direction during use, FIG. 6. Each stand further comprises a rigid cross brace 46 between its two upwardly converging legs, and a U-shaped saddle 47, similar to the saddles 31 and 41, is provided on the top of each stand 44.

The apparatus further comprises a three part telescoping extension pipe assembly 48, FIG. 9, of sufficient length to extend entirely through the tubular core of even the longest carpet roll and beyond the ends thereof. The pipe assembly 48 embodies a center section 49 and a pair of reduced diameter end sections 50 which telescope into the center section 49 and lock therein releasably by means of convention spring-urged locking buttons 51 of the type frequently employed on adjustable chair legs, umbrella poles and the like. Indicator lines 52 and 53 are visibly marked on the pipe sections 49 and 50 to facilitate the assembly thereof.

Figure 8:
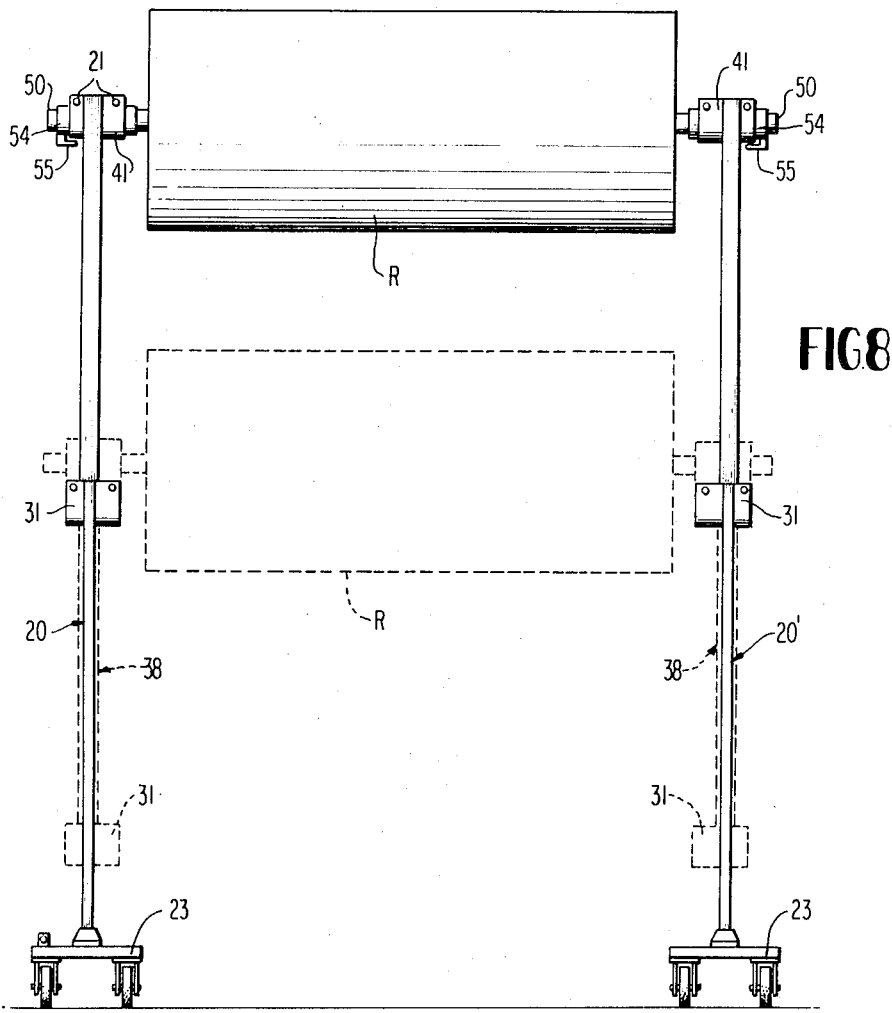
FIG. 8 is a similar elevational view showing the lifting of the roll to a greater elevation by the use of the jack extension frames, the roll having been lifted from the stationary stands as sown in FIG. 7 and the stands having been placed aside.

An adapter sleeve 54, FIG. 4, is also provided in the apparatus for placement in the saddles 31 and 41 to reinforce and stabilize the same. The sleeve 54 has a clip 55 on one end thereof to engage under the saddle 31 or 41 as the case may be so as to hold the sleeve 54 against movement. FIG. 8 of the drawings shows the sleeve 54 mounted in each of the saddles 41 of extension frames 38.

Finally, the apparatus comprises a third and considerably foreshortened lifting or jacking unit 56, FIG. 10, to be utilized with the units 20 and 20' for loading carpet rolls onto trucks and for unloading them. The unit 56 comprises a base member 57 having at its ends a pair of casters 58 lockable by pins 59 in the manner described for locking the casters 24. A detachable lateral stabilizing frame 60 extends from the middle of the base member 57 and carries a third caster 61 rendering the unit 56 stable as well as mobile. The unit 56 includes an upright rigid frame 62 rigid with the base member 57 and having a center jacking bar 63 similar to the jacking bar 21. A carriage 64 is movable upwardly and downwardly on the frame 62 under the influence of a mechanical jack head which travels on the bar 63, the jack head being operated by an oscillating handle 65. The jack mechanism may be identical to that shown at 28–29 in FIG. 1 and is conventional. Mounted on and movable with the carriage 64 is a horizontally projecting pipe section 66 adapted to fit telescopically into one of the pipe sections 50 of extension pipe assembly 48. A similar pipe section 67, FIG. 1, slips into the sleeve 54 and is also engageable telescopically in one of the pipe sections 50 or in a standard two-inch steel pipe which may form the core of a carpet roll. The carpet roll itself being handled by the apparatus is indicated throughout the drawings by the reference character R.

Operation

In the basic operation of elevating and transporting a large carpet roll, the two jacking units 20 and 20' are employed together as depicted in FIG. 5. The extension pipe assembly 48 is placed through the core or pipe which comes with a roll of carpet and the jack heads 28 with saddles 31 are lowered sufficiently to receive the load. The sleeves 54 and pin means 43 are placed into position on the saddles 31 and the pipes 67 enter the bores of the pipe sections 50. The two jacks are now operated to elevate the carpet roll by as much as six feet on the units 20 and 20' and the dollies 23 may be lashed together by using the strap 36, as previously described. In this manner, the heavy carpet roll may be moved through doorways and through relatively narrow aisles in stores to the desired location. The roll may be wound or unwound while supported on the units 20 and 20' by the use of a removable crank handle 68 shown in FIG. 5, which is an optional feature.

Figure 6:
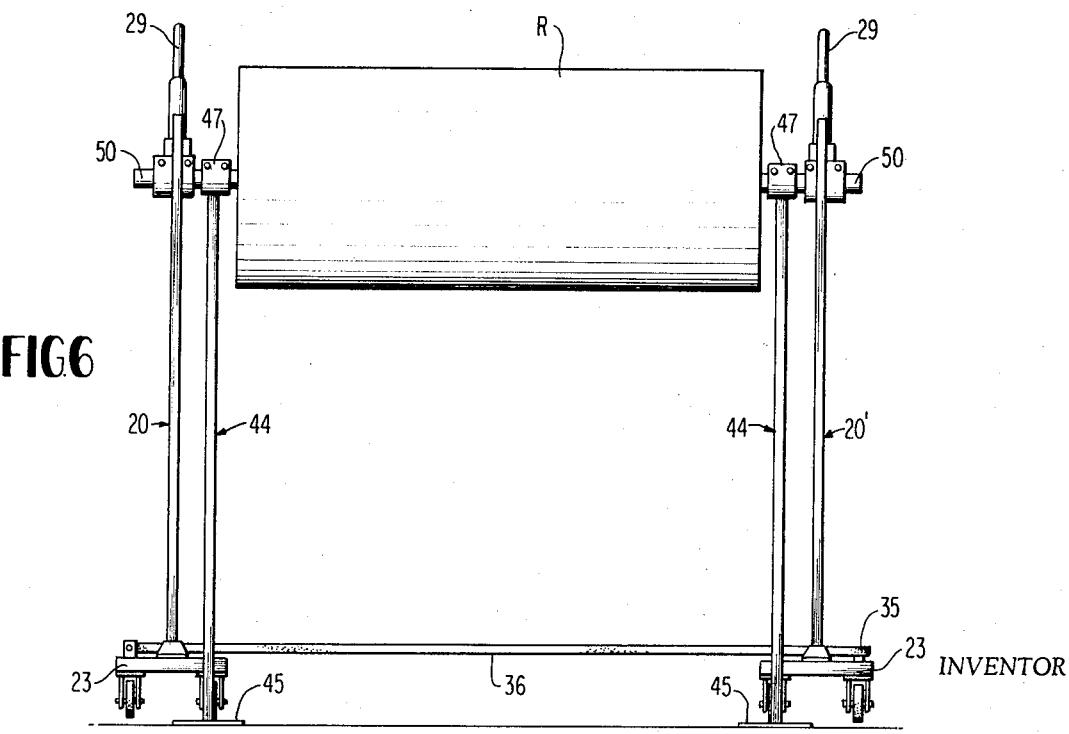
FIG. 6 is a similar side elevation showing the use of the jacking units for lifting the roll and placing it upon a pair of supporting stands which form additional components of the apparatus.

At any desired time, the two support stands 44 may be placed immediately inwardly of the lifting units 20 and 20', FIG. 6, and in straddling relation to the dollies 23. The jack heads 28 are operated to lower the roll R until the pipe sections 50 come to rest in the saddles 47 of the fixed stands. At this point, the units 20 and 20' may be set aside and the carpet roll may be utilized as desired while on the two stands 44.

Figure 7:
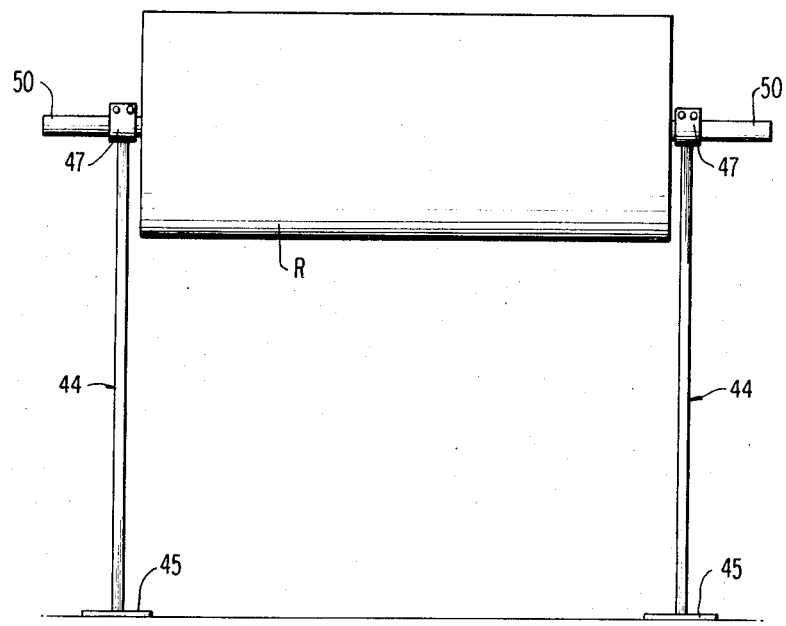
FIG. 7 is a similar view showing the stationary stands supporting the carpet roll.

If it is desired to place the carpet roll and a two-inch core pipe on an elevated wall rack, as much as eleven feet above floor level, referring to FIGS. 7 and 8, the jack heads 28 are fully lowered toward the dollies 23, and the cross brace 27 is removed, followed by the placement of the extension frames 38 over the bars 21 and 22 of the two lifting units 20 and 20'. The saddles 41 of the extension frames 38 are adjusted beneath the pipe sections 50 or the two-inch core pipe of the carpet roll and the jack heads are operated to raise the carpet roll to a maximum elevation of about eleven feet or as required, as illustrated in FIG. 8. As the carpet is lifted from the stands 44, the same may be set aside. The units 20 and 20' with the extension frame 38 are now moved to the proper point to transfer the roll and the pipe supporting it into the bearings of the overhead rack, not shown. When this is done, the jack heads 28 are lowered to transfer the weight of the roll to the rack and the units 20 and 20' are removed and the extensions 38 may be separated from them.

When the apparatus is used to load a roll of carpet from street level into a truck or onto a shipping dock, FIG. 11, the lifting units 20 and 20' are employed with the extension pipe assembly 48 and safety strap 36 to elevate and transport the roll R to the proper location. At this point, the extension pipe 66 of the small lifting unit 56 is slipped into the adjacent pipe section 50 with the wheels of the unit 56 slightly above the truck bed 69 or shipping dock, FIG. 11. The jack heads of the unit 20 and 20' are operated so as to lower the roll R sufficiently to allow the smaller unit 56 to support the weight at one end on the truck bed. At this time, the unit 20' is no longer needed and after disconnecting the strap 36 can be disengaged from the pipe section 50 and removed. The units 20 and 56 are now utilized to push the roll R fully into the truck and when this has been done the jacks of the units 20 and 56 are operated to lower the roll onto the truck bed and the two lifting units can be removed along with extension pipe assembly 48. A reverse procedure is followed using the components 20, 20', 48 and 56 to unload a heavy roll or carpet from a truck or the like.

It may now be seen that the apparatus components work together in a closely coordinated manner to allow the complete manipulation of a carpet roll which otherwise could only be handle in a very inefficient manner with much manual labor involved. The advantages and economies possessed by the invention should now be clear to anyone skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. Apparatus for handling carpet rolls and the like comprising in combination a companion pair of wheeled lifting units having jack heads, operating means for the jack heads and guide bar means for the jack heads, pipe receiving saddles carried by the jack heads and movable therewith, an elongated pipe assembly capable of extending through the core of a carpet roll to support the latter and having ends restable in said saddles so that the carpet roll may be lifted with the pipe assembly and transported, a pair of fixed support stands for the carpet roll and pipe assembly and having pipe receiving saddles at their tops and adapted to receive the carpet roll and pipe assembly from the lifting units and support the same at a fixed elevation, extension frames having pipe receiving saddles engageable onto the guide bar means of the lifting units and adapted to lift the carpet roll and pipe assembly from said stands to a substantial elevation for placement of the carpet roll onto a wall rack, and a cooperating foreshortened wheeled lifting unit including an elevatable carriage and a pipe extension engageable into one end of the pipe assembly and adapted to have the weight of one end of the carpet roll transferred thereto on a truck bed or the like by operation of the jack heads of said pair of lifting units.

2. The structure of claim 1, and said foreshortened wheeled lifting unit including an independently operable jacking means to raise and lower said carriage, and said pipe extension secured to said carriage and being movable therewith to a prescribed elevation.

3. The structure of claim 2, and a pair of caster wheels on opposite ends of the foreshortened lifting unit, and a detachable horizontal extension frame on one side of the base of the foreshortened lifting unit substantially midway between the caster wheels of such unit and having a third caster wheel thereon.

4. The structure of claim 1, and said pipe assembly comprising a three section pipe assembly, and means to releasably secure the three sections of the assembly together telescopically.

5. The structure of claim 1, and said wheeled lifting units comprising low elevation dolly bases having corner caster wheels, and means to releasably lock the caster wheels of said dolly bases in fixed parallel positions.

6. The structure of claim 5, and an extensible and retractable strap on the dolly base of one lifting unit, a connector for the free end of the strap on the dolly base of the other lifting unit, and means to tighten the strap on said one unit.

7. The structure of claim 1, and said pair of fixed support stands comprising separate stable A-frame stands having stabilizing feet and said saddles on the tops of the stands being U-shaped and open at the top, said feet of the stands being spaced apart sufficiently to straddle the bases of the wheeled lifting units when used in conjunction therewith close to the interior sides of the lifting units.

8. The structure of claim 1, and each wheeled lifting unit comprising a rectangular low elevation dolly base having corner caster wheels, means to releasably lock said caster wheels against swiveling, a vertical jack bar and a parallel stabilizer bar secured to and rising from said dolly base centrally thereof, a mechanically operated traveling jack head on said jack bar having a load lifting arm, a substantially U-shaped saddle adapted to receive a pipe on said lifting arm, and a guide sleeve secured to the saddle and sliding telescopically on said stabilizer bar.

9. The structure of claim 8, and an adapter sleeve restable within said saddle and an extension pipe within the adapter sleeve and engageable within one end of said pipe assembly.

10. The structure of claim 8, and a clip on the adapter sleeve engageable with the saddle to secure the adapter sleeve thereon.

11. The structure of claim 8, and each extension frame comprising a pair of spaced parallel tube members engageable telescopically over said jack and stabilizer bars and having their lower ends resting on the jack head and guide sleeve, the saddle of the extension frame being a U-shaped saddle at the top of the frame between said tube members.

References Cited

UNITED STATES PATENTS

| | | | |
|---|---|---|---|
| 3,404,794 | 10/1968 | Wilson | 214—390 X |
| 3,534,880 | 10/1970 | Washburn, Jr. et al. | 214—390 |
| 3,638,815 | 2/1972 | Fincher | 214—390 |

ALBERT J. MAKAY, Primary Examiner

U.S. Cl. X.R.

214—390; 254—2 R